United States Patent [19]

Fujisaki et al.

[11] Patent Number: 4,686,400
[45] Date of Patent: Aug. 11, 1987

[54] SMALL SIZED FAN MOTOR

[76] Inventors: Kiyonori Fujisaki, 195-4 Ooyaguchi, Matsudo-shi, Chiba-ken; Toshio Kobayashi, 6-1-13 Kitakarasuyama, Setagaya-ku, Tokyo; Heihachi Kato, 232 Terao, Kawagoe-shi, Saitama-ken, all of Japan

[21] Appl. No.: 853,723
[22] Filed: Apr. 18, 1986

[30] Foreign Application Priority Data

Aug. 5, 1985 [JP] Japan .................................. 60-172659

[51] Int. Cl.$^4$ ............................................. H02K 21/12
[52] U.S. Cl. .................................... 310/67 R; 310/90; 310/156
[58] Field of Search ............................ 310/90, 67, 156

[56] References Cited
U.S. PATENT DOCUMENTS

| | | | |
|---|---|---|---|
| 2,924,730 | 2/1960 | Spitler | 310/67 X |
| 3,175,755 | 3/1965 | Rockafield | 310/67 |
| 3,881,123 | 4/1975 | Paul | 310/67 X |
| 4,115,715 | 9/1978 | Müller | 310/67 X |
| 4,311,933 | 1/1982 | Riggs | 310/67 X |

*Primary Examiner*—Donovan F. Duggan
*Attorney, Agent, or Firm*—Robert F. Ziems

[57] ABSTRACT

A small sized fan motor is disclosed, wherein an armature is supported by a disk-shaped support in a cantilever fashion, a rotor has an outer periphery for fixedly mounting a fan having a plurality of blades thereon and an inner periphery for fixedly mounting a permanent magnet thereon in a manner that the permanent magnet surrounds the armature with a clearance being provided therebetween, and a rotational bearing having an inner race secured to the disk-shaped support and an outer race secured to the inner periphery of the rotor in a manner that the rotational bearing is arranged coaxial with the permanent magnet within the rotor.

11 Claims, 5 Drawing Figures

SMALL SIZED FAN MOTOR

BACKGROUND OF THE INVENTION

The invention relates to a small sized fan motor and more particularly relates to a mechanism of the fan motor including a single rotational bearing supporting a rotor and a fan having a plurality of blades resulting in reduction of the axial dimension of the motor.

So far the conventional small sized fan motors have been of a brushless outer rotor type using Hall generators or Hall IC. As described in the publication "DC Servo-Motors for Mechatronics" the third edition published by the publisher Sogo Denshi of Japan, such a conventional small sized fan motor has a center shaft rotated with a rotor, the center shaft being supported by a pair of rotational bearings and having a fan secured thereto. With such a structure being provided, it is inevitable that the motor is accordingly elongated in the axial direction. Therefore the conventional small sized fan motor has been unsuitable to be used in a small sized electronic apparatus, especially in a thinner apparatus. Even in the conventional brushless outer rotor type of motor without using a center shaft, a pair of rotational bearings are employed in the axial direction of the motor resulting in limitation of reducing the axial dimension of the motor. More precisely these conventional small sized fan motors as mentioned above have the axial dimension about 24 mm–25 mm at least.

OBJECTS AND SUMMARY OF THE INVENTION

The present invention has been provided to eliminate such a defect and disadvantage of the prior art. It is therefore an object of the invention to provide a more or less elongated rotor to accomodate therein a permanent magnet and a rotational bearing side by side in the axial direction so as to reduce the axial dimension of the motor to approximately 12.5 mm which is about a half of that of the conventional small sized fan motor. It is another object of the invention to provide a grooved ball bearing as the rotational bearing which is sufficient enough to bear the thrust load which may be caused due to the rotation of the fan. It is another object of the invention to provide a support on which the fan is rotated by way of the rotational bearing and the rotor, the support having a plurality of holes provided at predetermined locations thereof so as to automatically determine the positions of Hall generators employed in the motor as inserted in the holes. It is still another object of the invention to provide a small sized fan motor which may be easily and precisely assembled.

In short, the present invention comprises an armature, a disk-shaped support supporting the armature in a cantilever fashion, a rotor having an inner periphery and an outer periphery and made of magnetizable material, a permanent magnet mounted with the rotor, the permanent magnet having an outer-periphery secured to the inner periphery of the rotor and an inner periphery arranged around the armature, a fan having a plurality of blades secured therearound and being secured to the outer periphery of the rotor, a rotational bearing having an inner race and an outer race, the inner race being secured to the support and the outer race secured to the inner race of the rotor in a manner that the rotational bearing is arranged coaxial with the permanent magnet in the axial direction with the rotor.

BRIEF DESCRIPTION OF THE DRAWINGS

The above mentioned and further objects and the advantages of the invention will be fully understood from the following detailed description in reference to a preferred embodiment as shown in the attached drawings, in which.

DETAILED DESCRIPTION OF THE INVENTION

Figure 1:
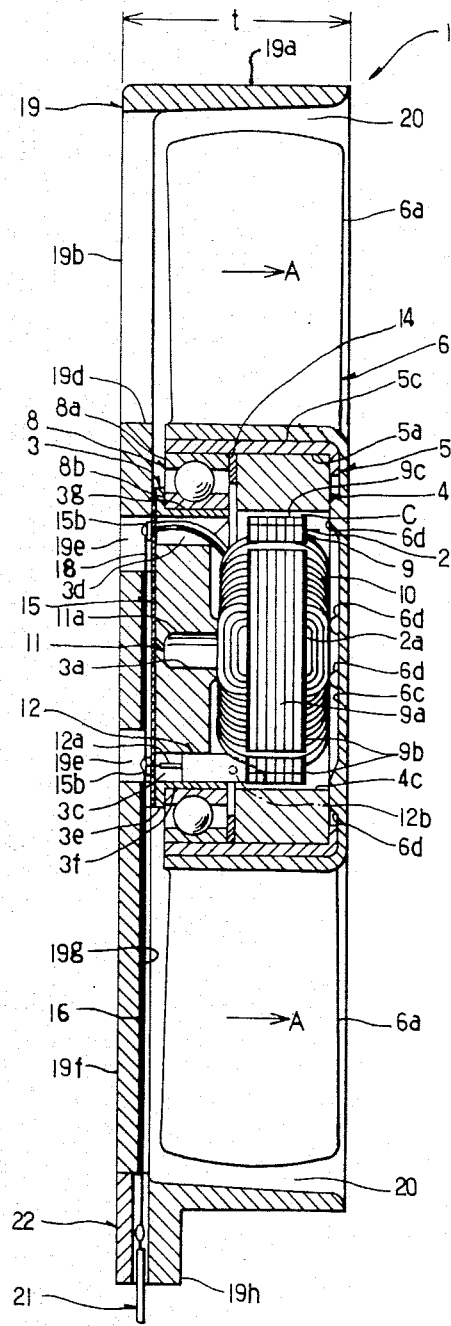
FIG. 1 is a sectioned side elevational view of the invention taken along the line I—I of FIG. 2.
Figure 5:
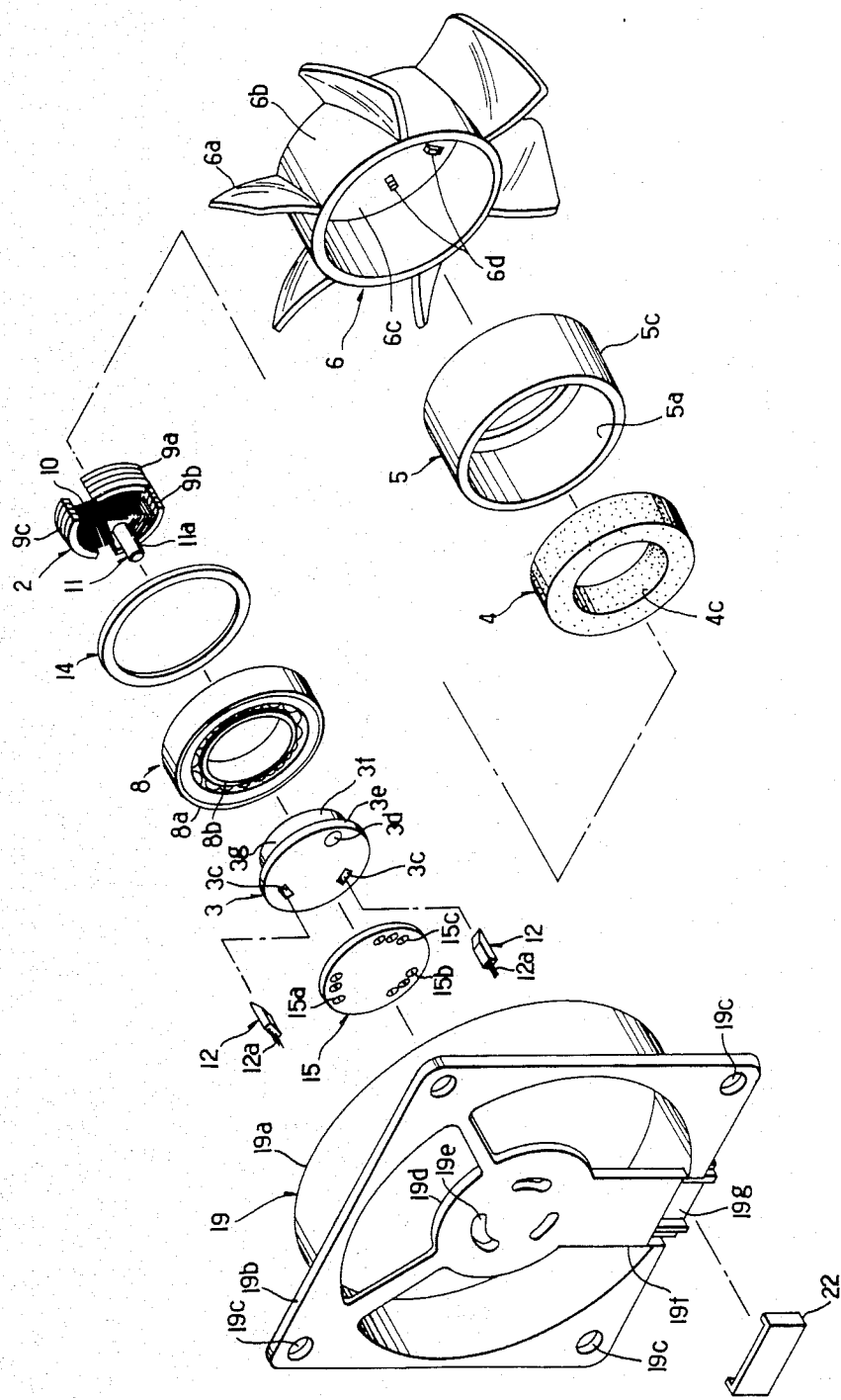
FIG. 5 is an exploded perspective view of the small sized fan motor.

In reference to FIGS. 1 and 5, the small sized fan motor 1 of the invention substantially comprises an armature 2, a support 3 in the form of disk, a permanent magnet 4, a rotor 5, a fan 6 and a rotational bearing 8.

The armature 2 is composed of a core 9 and a coil 10 wound around the core 9 which is formed with the lamination 9a of magnetizable material such as a silicon steel plate. The core 9 has three poles 9b by way of example and the coil 10 is wound around each of these poles 9b. The core 9 has a center shaft 11 secured thereto, and the shaft has one end 11a fixedly inserted into a center hole 3a of the support 3. Thus the armature 2 is fixedly mounted on the support 3 which acts as a cantilever.

The disk shaped support 3 is composed of a flange portion 3e and a cylinder portion 3f having a periphery 3g and the center hole 3a for supporting the core shaft 11. As particularly shown in FIG. 5, the flange portion 3e has a pair of holes 3c formed therein for securing a pair of Hall generators 12 thereon, each having leads 12a, and another hole 3d through which the leads of the coil 10 is drawn out. Each of the holes 3c for securing the Hall generators 12 is rectangular and 2.1 mm long and 1.6 mm wide for example in case each of Hall generators 12 is 2 mm long and 1.5 mm wide, such that a gap of approximately 0.1 mm remains when each Hall generator 12 is secured to each hole 3c. On the other hand, the hole 3d is circular. Further the support 3 is made of a non-magnetizable material such as a synthetic resin.

The permanent magnet 4 is in the form of a ring arranged as surrounding the armature 2 and is rotatable with respect to the latter with an air gap C of a predetermined width being provided therebetween. This ring shaped magnet 4 may be of the type partly magnetized or may be divided into so many parts.

The rotor 5 is made of a magnetizable material such as an iron in the form of a hollow cylinder more or less elongated in the axial direction and having an outer periphery 5c and an inner periphery 5a to which the permanent magnet 4 is secured. If the magnet 4 is made of a synthetic resin, this may be pressed into the rotor. If the magnet is made of ferrite, this may be secured to the rotor 5 by other proper means such as the fastening screws.

Further the rotational bearing 8 is pressed into the rotor 5 as being coaxial with the permanent magnet 4. The rotational bearing 8 is substantially composed of an outer race 8a and an inner race 8b. The outer race 8a of the rotational bearing 8 is secured to the inner periphery 5a of the rotor 5, and the inner race 8b of the rotational bearing 8 is secured to the periphery 3g of the cylinder portion 3f of the support 3. Between the permanent magnet 4 and the rotational bearing 8 there is provided a thrust washer 14 which may be made of a magnetizable or non-magnetizable material.

The fan 6 is in the form of a cylinder 6b having a number of blades 6a secured therearound. The fan 6 has a wall 6c secured to one end of the cylinder 6b. The wall 6c has a plurality of projections formed thereon to be pressed against the permanent magnet 4. The fan 6 is secured to the outer periphery 5c of the rotor 5 by means of any proper means and the like.

The rotational bearing 8 enables the rotor 5 to rotate on the support 3 and is a grooved ball bearing made of a steel. The rotational bearing 8, however, may be preferable to be made of ceramics and the like of non-magnetizable material in view of the magnetic circuit to be employed.

Thus the small sized fan motor 1 of the invention has the single rotational bearing 8 carries the rotor 5 and the fan 6 to enable the latter to rotate on the support 3.

A disk 15 is secured to the flange portion 3e of the support 3 by means of fastening screws, rivets or welding. The disk 15 has three sets of terminals 15a, 15b, 15c arranged thereon spaced about 120° C. from each other, which correspond to the holes 3c, 3c, 3d respectively of the flange portion 3e of the support 3. In combination with the small sized fan motor 1 of this invention, a specific control circuit is employed, which is disclosed in the copending U.S. patent application Ser. No. 751,281. Due to the employment of the specific control circuit, the generally four leads of each Hall generator 12 may be reduced to three leads 12a, and accordingly each set of terminals 15a, 15b, 15c consists of three terminals. The leads 16 (in FIG. 3) for each Hall generator 12, which are soldered to the sets of terminals 15a, 15b. may be comparatively fine because the electric current flowing through the leads 16 is weak. On the other hand, the leads 18 to be soldered to the set of terminals 15c for the coil 10 are comparatively thick because the current flowing through the leads 18 is of comparatively high value.

Figure 2:
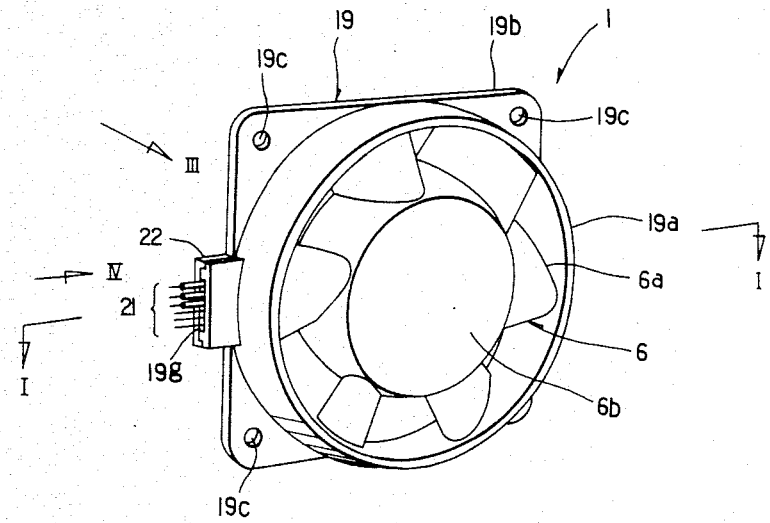
FIG. 2 is a perspective view of a small sized fan motor according to the invention.
Figure 4:
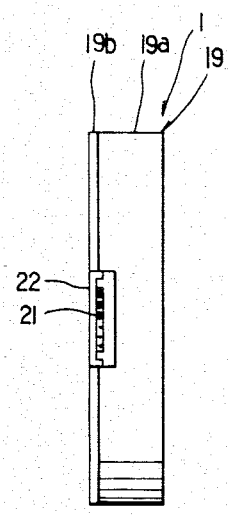
FIG. 4 is a side elevational view taken from the side as indicated by the arrow IV.
Figure 3:
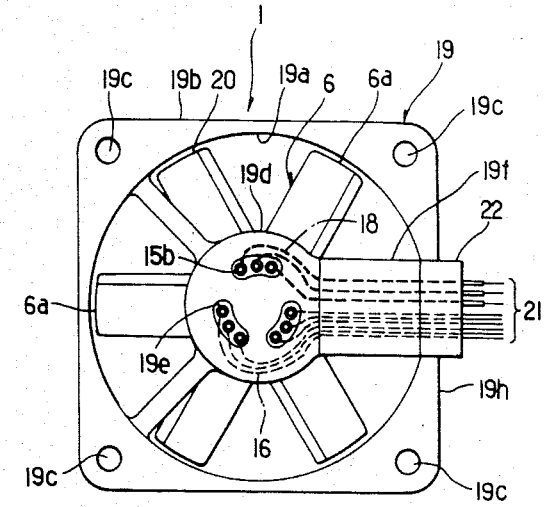
FIG. 3 is a back side view taken from the side as indicated by the arrow III of FIG. 2.

In reference to FIGS. 2 to 4, a case 19 for the small sized fan motor 1 is composed of a fan shroud 19a which is sectionally circular and a mount 19b of a square shape by which the case 19 is secured to an electronic apparatus (not shown). The mount 19b has attaching holes 19c formed at the four corners thereof. The fan shroud 19b is so formed as to surround the fan 6 with a proper clearance 20 being provided therebetween. The mount 19b of the fan shroud 19 has a center wall 19d which is formed with a plurality of arcuated slots 19e as particularly shown in FIGS. 3 and 5. The center wall 19d has a guide wall 19f extending toward one side 19h of the mount 19b, and has an inner face formed with a guid groove 19g as particularly shown in FIG. 2. The leads 16, 18, which are soldered to the respective terminals 15a, 15b, 15c of the disk 15, are extended along the guide groove 19g of walls 19d, 19f and drawn out of the guide groove 19g at the side 19h of the mount 19b, and then are soldered to external leads 21. The exposed ends of the leads 16, 18 are protected by a cover 22 at the side 19h of the mount 19b, the cover 21 being secured to the side 19h by way of the supersonic waves or the like.

The two Hall generators 12 are partly inserted into the respective holes 13c of the support as shown in FIG. 1 in a manner as to receive the magnetic flux from the inner periphery 4c of the permanent magnet 4. Further the Hall generators 12 are respectively located at the positions corresponding to the spaces between the core poles 9b of the armature 2.

With the structure of the invention as mentioned above, when the external leads 21 are connected to a power source (not shown), the current is supplied to the armature 2 and is energized, and then the permanent magnet 4 starts to rotate with the attracting and repulsing actions between the magnet 4 and the armature 2, and accordingly the rotor 5 and the fan 6 secured to the rotor are rotated. As the result, the air flows in the direction as indicated by an arrow mark A in FIG. 1 to cool down the electronic apparatus in which the fan device of the invention is incorporated. If the rotational bearing 8 is made of a magnetizable material such as a steel iron, the rotational bearing will be attracted to the permanent magnet 4 during rotation thereof, and the thrust load is applied to the thrust washer 14. However the thrust load will give no adverse effect because the rotational bearing is a ball bearing of deep grooved type which is sufficient enough to bear the thrust load. Further the radial load will give no adverse effect because the outer race 8a of the rotational bearing 8 is made sufficiently wide and is considerably spaced from the inner race 8b. The rotational bearing 8 is therefore free from the undesired eccentric deformation during rotation thereof and will be smoothly rotated.

According to the invention, since the rotor 5 is supported by a single rotational bearing 8, the small sized fan motor of the invention may have a thickness remarkably reduced to a minimum, for example, to 12.5 mm which has so far never been obtained.

Further the two holes 3c of the support 3 for securing the two Hall generators 12 are arranged as angularly spaced from each other and each dimensioned more than the Hall generators such that approximately 0.1 mm will remain when the Hall generators are inserted into the respective to the support 3 with the required angular space being maintained therebetween. Moreover with the center shaft 11 of the armature 2 being pressed into the center hole 3a of the support 3, the relative positions will be determined between the Hall generators 12 and the poles 9b of the core 9. Thus the small sized fan motor of the invention is very easily assembled with a required accuracy.

Although the present invention has been fully described by way of a preferred embodiment in reference to the attached drawings, it is to be noted that various changes and modifications will be apparent to those who are skilled in the art. Such changes and modifications will not be regarded as being inventive but will be regarded as being included in the spirit and scope of the appended claims.

What is claimed is:

1. A small sized fan motor comprising:
   an armature; support means for supporting said armature at one end thereof in cantilever fashion; rotor means including a cylindrical rotor having an inner cylindrical surface and an outer periphery and made of a magnetizable material; a permanent magnet mounted within said cylindrical rotor, said permanent magnet having an outer periphery fitted to said inner surface of said cylindrical rotor and an inner surface extending about said armature; fan means including a cylindrical body and a plurality of generally radial blades secured therearound, said cylindrical body being secured to the outer periphery of said cylindrical rotor; means for rotatably supporting said rotor from said support means including a radial bearing having an inner race and an outer race; and detector means including a plurality of Hall generators mounted on said support means; said support means including a disk-shaped member having a cylindrical support portion of a predetermined diameter; said inner race of the radial bearing being secured to said cylindrical support portion of said disk-shaped member, said outer race of the radial bearing being fitted to said inner cylindrical surface of said rotor in a manner that said radial bearing lies in substantially the same annulus as said permanent magnet but spaced therefrom in the axial direction within said cylindrical rotor, said Hall generators being mounted on said disk-shaped support merber radially thereof and angularly spaced from each other, and said Hall generators being located adjacent to said permanent magnet so as to detect the magnetic flux of said permanent magnet as the latter is rotated.

2. The small sized fan motor as defined in claim 1, wherein said bearing is a grooved ball bearing.

3. The small sized fan motor as defined in claim 2, wherein said armature has a center shaft which is secured to the center of said disk-shaped support.

4. The small sized fan motor as defined in claim 1, wherein said permanent magnet is ring-shaped.

5. The small sized fan motor as defined in claim 4, wherein said permanent magnet is divided into a plurality of pieces.

6. A small sized fan motor comprising: an armature; a disk-shaped member supporting said armature from one end in cantilever fashion; a rotor having an inner cylindrical surface and an outer periphery and made of a magnetizable material; a permanent magnet mounted within said rotor, said permanent magnet having an outer periphery fitted within said inner cylindrical surface of said rotor and an inner surface extending about said armature; a fan having a plurality of blades radiating from the outer periphery of said rotor; means for rotatably supporting said rotor from said disk-shaped member and consisting essentially of a single bearing having an inner race, an outer race, and low friction means between said races, said inner race being secured to said disk-shaped support and said outer race being fitted within said inner cylindrical surface of said rotor in such a manner that said bearing lies in substantially the same annulus with said permanent magnet and is spaced in the axial direction therefrom within said rotor.

7. The small sized fan motor as defined in claim 6, wherein said single bearing is a grooved ball bearing.

8. The small sized fan motor as defined in claim 6, wherein said armature has a center shaft which is secured to the center of said disk-shaped support.

9. A small sized fan motor comprising: an armature; a disk-shaped member for supporting said armature at one end in cantilever fashion; a cylindrical rotor having an inner cylindrical surface and an outer periphery and made of a magnetizable material; a cylindrical permanent magnet mounted within said rotor, said permanent magnet having an outer periphery fitted to said inner cylindrical surface of said rotor and an inner surface extending about said armature; a fan having a cylindrical body and a plurality of blades radiating therefrom, said body being secured to the outer periphery of said rotor; a single rotational bearing having an inner race and an outer race, said inner race being secured to said disk-shaped support and said outer race being fitted within said inner cylindrical surface of said rotor, said permanent magnet and said rotational bearing having substantially the same outer diameter so that said permanent magnet and said rotational bearing are secured to a portion of said rotor having a substantially constant inner diameter.

10. The small sized fan motor as defined in claim 9, wherein said rotational bearing is a grooved ball bearing.

11. The small sized fan motor as defined in claim 9, wherein said armature has a center shaft which is secured to the center of said disk-shaped support.

* * * * *

UNITED STATES PATENT AND TRADEMARK OFFICE
CERTIFICATE OF CORRECTION

PATENT NO. : 4,686,400

DATED : August 11, 1987

INVENTOR(S) : Kiyonori Fujisaki et al

It is certified that error appears in the above-identified patent and that said Letters Patent is hereby corrected as shown below:

Column 5, line 18, change "merber" to --member--.

Signed and Sealed this

Nineteenth Day of January, 1988

Attest:

DONALD J. QUIGG

*Attesting Officer*   *Commissioner of Patents and Trademarks*